United States Patent

Plundrich et al.

[11] Patent Number: 5,804,680
[45] Date of Patent: Sep. 8, 1998

[54] RESIN SYSTEM OF PHOSPHORUS-CONTAINING ACRYLATE, UNSATURATED COMPOUND AND PHOTOINIATOR

[75] Inventors: Winfried Plundrich, Germering; Ernst Wipfelder, München, both of Germany

[73] Assignee: Siemens Aktiengesellschaft, Munich, Germany

[21] Appl. No.: 793,689

[22] PCT Filed: Sep. 5, 1995

[86] PCT No.: PCT/DE95/01202

§ 371 Date: Mar. 5, 1997

§ 102(e) Date: Mar. 5, 1997

[87] PCT Pub. No.: WO96/07678

PCT Pub. Date: Mar. 14, 1996

[30] Foreign Application Priority Data

Sep. 6, 1994 [DE] Germany .......................... 44 31 751.4

[51] Int. Cl.⁶ .................................................. C08F 220/28
[52] U.S. Cl. ...................... 526/274; 106/287.29; 522/16; 522/103; 523/427; 523/457; 525/481; 525/502; 525/529; 525/531; 525/532; 526/220; 526/222; 526/227
[58] Field of Search ...................... 106/287, 29; 523/427, 523/457; 522/16, 103; 526/220, 227, 222, 274; 525/481, 502, 529, 531, 532

[56] References Cited

U.S. PATENT DOCUMENTS

| 4,434,278 | 2/1984 | Skiscim | 525/531 |
| 4,663,184 | 5/1987 | Hegel | 568/14 |
| 5,095,059 | 3/1992 | Kitamura et al. | 524/272 |
| 5,219,957 | 6/1993 | Patzschke et al. | 525/530 |

FOREIGN PATENT DOCUMENTS

| 0 278 029 A1 | 2/1987 | European Pat. Off. . |
| 0 412 425 A1 | 8/1990 | European Pat. Off. . |
| 20 52 569 C3 | 10/1970 | Germany . |
| 32 207 504 A1 | 3/1982 | Germany . |
| 62-15210 | 1/1987 | Japan . |
| 5-247155 | 9/1993 | Japan . |
| WO 94/10223 | 10/1993 | WIPO . |

OTHER PUBLICATIONS

WPAT accession No. 81–65167D/36 for Japanese Patent No. 59–90802. Ube Industries KK, Jul. 1981.

*Primary Examiner*—Robert E. Sellers
*Attorney, Agent, or Firm*—Hill & Simpson

[57] ABSTRACT

A flame-resistant, UV-curable single-component reactive resin system comprises a phosphorus-containing acrylate, another unsaturated compound which can undergo free radical copolymerization with acrylates and a free radical initiator system.

9 Claims, No Drawings

RESIN SYSTEM OF PHOSPHORUS-CONTAINING ACRYLATE, UNSATURATED COMPOUND AND PHOTOINIATOR

FIELD OF THE INVENTION

The present invention is directed toward flame resistant reactive resins and, more specifically, to reactive resins that are suitable for covering electronic components that can be cured by UV irradiation which results in flame-resistant covering compositions. Still more specifically, the present invention relates to flame-resistant single-component reactive resins that are suitable for covering or encasing electronic components.

BACKGROUND OF THE INVENTION

Process-friendly, environmentally compatible and flame-resistant reactive resin molded materials are required for covering or encasing electronic components. Both for reasons of processing reliability and from economic considerations, single-component reactive resins which are storage-stable at room temperature for at least three months and can be cured within a short time at relatively mild curing temperatures of, for example, 100° C. are increasingly required. A further requirement of reactive resins which can be employed for this purpose and of the molded materials produced therefrom is a corrosion-free behavior which does not impair the function and therefore the life of a component covered therewith. The flameproofing aimed for should be such that the reactive resin and the molded materials produced therefrom can easily be recycled or at least can be disposed of without problems.

A reactive resin system which comprises phosphorus-containing reactive compounds to improve the flame resistance is known from EP-A 41 24 25. Reaction of a hydroxy-functional phosphorus compound with an organic anhydride gives an acid ester which can be used as a phosphorus-containing hardener component for a two-component reactive resin based on epoxide.

A single-component phosphorus-containing reactive resin system which can be cured under initiation by UV is known from WO 94/10 223. The phosphorus component is the glycidyl ester of a phosphorus-containing acid which, together with the usual epoxy resins and a photoinitiator for a cationic curing process, results in a single-component reactive resin system which shows an adequate storage stability and good corrosion properties.

Phosphorus-containing unsaturated compounds which have been proposed for coating metals and for use as adhesives are known from EP-A 278 029. Alkali metal salts and alkaline earth metal salts are present as catalysts for the thermal curing. This impairs their usefulness for electronic components.

Unsaturated phosphorus-containing carboxylic acid derivatives are known from DE 20 52 569. These can be reacted with other monomers under acid conditions to give copolymers.

A photosensitive resin composition which comprises a phosphate compound having a photopolymerizable unsaturated bond in combination with a heteroaromatic, such as, for example, benzotriazole, is known from DE-A-32 07 504.

SUMMARY OF THE INVENTION

The object of the present invention is therefore to provide another single-component ready-to-use reactive resin which is storage-stable for several months at room temperature, can be cured completely at moderate temperatures of up to about 100° C., and which can easily be processed with the apparatuses customary for casting resins and which can be cured to molded materials which have an adequate flame resistance required for electronic components and which exhibits good corrosion properties.

These objects are achieved according to the invention with a reactive resin system which comprises a phosphorus-containing acrylate, an unsaturated compound which can undergo free radical copolymerization with acrylates and a free radical photoinitiator system.

A number of phosphorus-containing acrylates which can easily be prepared from customary and reactive phosphorus compounds are proposed for the reactive resin system according to the invention.

DETAILED DESCRIPTION OF THE PRESENTLY PREFERRED EMBODIMENTS

The phosphorus-containing acrylates can be combined with commercially available acrylates or epoxy acrylates and a photoinitiator system to give the reactive resin system according to the invention. This is storage-stable for at least six months at room temperature. It can easily be applied without a solvent using application devices known from casting resins, and has, for example, a viscosity at 60° C. of 1000 to 5000 mPas. The resin of the present invention shows good corrosion properties on electronic components.

The reactive resin system can be cured in a maximum of two minutes by means of UV irradiation. The phosphorus-containing acrylates, or the phosphorus contained therein, show no adverse influence on the curing reaction here.

An adequate flame resistance can be achieved by establishing a sufficiently high phosphorus content of, for example, 1 to 5% by weight, preferably 1.5 to 3% by weight. Standard UL 94 V0 from Underwriters Laboratories is complied with in one embodiment example up to a specimen thickness of 1.6 mm.

A wide-ranging spectrum of properties can be achieved in the reactive resin system by admixing fillers and by choice of suitably matched acrylates. For example, the flame resistance can be improved further by admixing suitable fillers, such as, for example, aluminum hydroxide or magnesium hydroxide.

The thermal reactivity can be modified by admixing free radical initiators which can be activated by heat, for example organic peroxides. Those regions of a reactive resin applied to a component which are shielded from UV irradiation can thus also be thoroughly cured completely by after-treatment with heat. Such shielded regions would otherwise show incomplete curing after the irradiation and therefore lead to irregularities which could impair the properties of the components covered or embedded with the free radical initiators. So that the storage stability is not impaired by the free radical initiator which can be activated by heat, organic peroxides having a decomposition point of preferably above 100° C. are chosen.

The thermal/mechanical properties can be influenced advantageously by suitable choice of the phosphorus-containing acrylates (component A) and the other unsaturated compounds (component B). A higher mechanical strength and a higher glass transition temperature are achieved by using polyfunctional acrylates or copolymerizable unsaturated compounds, so-called cross-linking intensifiers or reactive diluents, which increase the crosslinking density in the reactive resin molded material. Improved flameproofing is achieved by using components having a high content of aromatic groups.

A first possibility of obtaining phosphorus-containing acrylates comprises reaction of a hydroxy-functional phosphorus compound I with an isocyanatoalkyl (meth)acrylate II

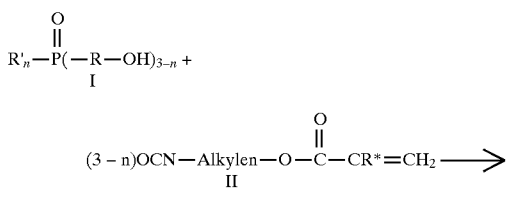

in these formulae:

n=0 or 1

R' is alkyl or aryl;

R: $-(CH_2-)_K$, where K=1 to 5, $-O-(CH_2-)_m$, where m=1 to 5, or

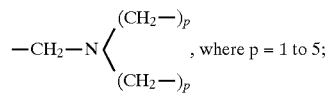

R*: hydrogen or methyl.

Instead of the isocyanatoalkyl (meth) acrylate II, the reaction can also be carried out with methacryloyl isocyanate IX.

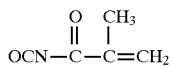

The reaction, with or without a solvent, was carried out in a stoichiometric ratio, a urethane-bridged phosphorus-containing (meth)acrylate being formed.

Another possibility for the preparation of a phosphorus-containing acrylate comprises reaction of a phosphorus-containing epoxide III with a hydroxy-functional acrylate, for example a hydroxyalkyl (meth)acrylate IV.

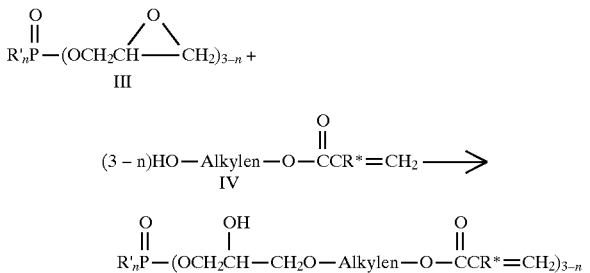

in these formulae: n=0, 1 or 2;

R': is alkyl or aryl;

R*: hydrogen or methyl.

The phosphorus-containing epoxides can be esters, such as, for example, glycidyl esters, of phosphonic acid. The hydroxy-functional acrylate preferably contains a primary OH group, in order to counteract the lower reactivity of the phosphorus-containing epoxide compound. The mono- or diglycidyl compounds are preferably reacted with mono- to trihydroxy compounds. Required as catalyst is a strong acid, for example a hexafluoroantimonate, in a concentration of 0.1 to 5% by weight, preferably 0.2 to 1% by weight. For storage stability reasons, a blocking agent for the catalyst must be added to the phosphorus-containing acrylate thus obtained. For complete neutralization of the acid, the corresponding amount of an amine is added to the reactive resin system. Thereafter, neither the catalyst nor the blocking agent has an adverse influence on the storage stability or reactivity of the reactive resin system.

Phosphorus-containing acrylates can furthermore be prepared via the reaction of glycidyl esters of phosphoric acid III with (meth)acrylic acid.

Another possibility for preparing phosphorus-containing acrylates comprises reaction of a hydroxyalkyl phosphorus compound I with a reactive (meth)acrylic acid derivative V

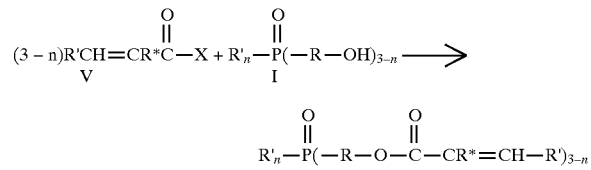

in which X is halogen and n is 0 or 1. Furthermore, R' is alkyl or aryl and R* is hydrogen or methyl. During the reaction, it is to be ensured here that the hydrohalic acid formed is trapped by a suitable base, for example by addition of an amine. The ammonium halide compound formed can be precipitated out, if required, and separated off.

The invention is explained in more detail below with the aid of embodiment examples.

A) Embodiment examples for phosphorus-containing acrylate components

EXAMPLE 1

A phosphorus-containing acrylate component VI is prepared by reaction of sec-butyl-bis(3-hydroxypropyl) phosphine oxide and isocyanatoethyl methacrylate:

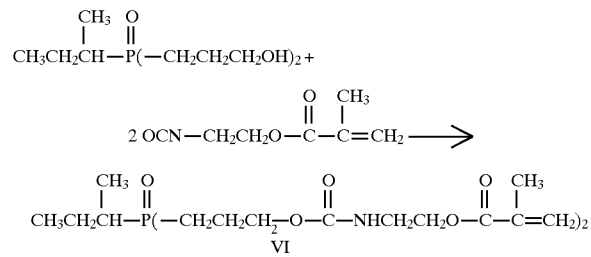

40 parts by weight (0.18 mol) of sec-butyl-bis (3-hydroxypropyl)phosphine oxide, diluted with 40 parts by weight of dried methylene chloride, are initially introduced into a 3-necked flask provided with a blade stirrer, thermometer and drying tube filled with desiccant (calcium oxide), and 55.84 parts by weight (0.36 mol) of isocyanatoethyl methacrylate are added dropwise by means of a dropping funnel with exclusion of moisture, while stirring. The reaction temperature should not rise above 25° C. during this addition, otherwise gentle cooling (water bath) is necessary. After a reaction time of 2 hours, the solvent is removed quantitatively in vacuo at a bath temperature of a maximum of 50° C., 4.8 parts by weight of hydroxyethyl methacrylate (0.04 mol) subsequently being added to block any isocyanate groups still present. The product VI has a viscosity at 60° C. of 750 mPas and a phosphorus content of 5.5% by weight and results in a storage stability at room temperature of more than 6 months. Storage in a refrigerator increases the storage stability to more than 1 year.

EXAMPLE 2

Preparation of a phosphorus-containing acrylate compound by reaction of an epoxide-containing phosphorus compound with a hydroxyalkyl methacrylate.

Another phosphorus-containing acrylate VII is produced by reaction of diglycidyl phenylphosphonate with an excess of hydroxyethyl methacrylate.

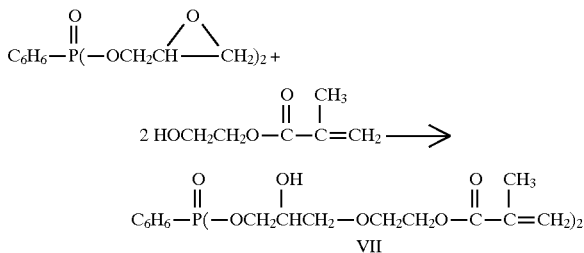

30.92 parts by weight (0.238 mol) of hydroxyethyl methacrylate (slight excess) and 0.31 part by weight of hexafluoroantimonic acid (1 mmol) are initially introduced into the apparatus described in Example 1, and 31.0 parts by weight (0.115 mol) of diglycidyl phenylphosphonate are added dropwise in the course of one hour. The reaction mixture is stirred at room temperature for 45 hours and then heated at 60° C. for 20 minutes. Thereafter, 0.3 part by weight (2 mmol) of 2-diisopropylaminoethanol is added to the reaction mixture to neutralize the catalyst, and the mixture is treated at 60° C. for another 5 minutes. The epoxide value determination subsequently carried out shows a conversion in the reaction of 99%.

The product VII has a viscosity at 25° C. of 14000 mPas and a phosphorus content of 5.6% by weight, and shows a storage stability of more than 1 year at room temperature.

EXAMPLE 3

Reaction of a hydroxyalkyl phosphorus compound with a reactive methacrylic acid derivative.

A phosphorus-containing acrylate VIII is obtained by reaction of sec-butyl-bis(3-hydroxypropyl)phosphine oxide with methacryloyl chloride

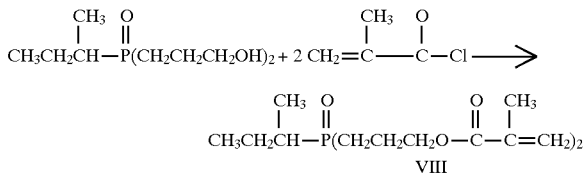

44.45 parts by weight (0.20 mol) of sec-butyl-bis(3-hydroxypropyl)phosphine oxide, 41.48 parts by weight (0.41 mol) of triethylamine (slight excess) and 60.0 parts by weight of dried toluene are initially introduced into a 3-necked flask provided with a blade stirrer, thermometer and a drying tube filled with calcium oxide, and 41.82 parts by weight (0.40 mol) of methacryloyl chloride and 40.0 parts by weight of dried toluene are added dropwise by means of a dropping funnel, while stirring constantly. The reaction vessel is cooled with a kryomat. The reaction temperature should not exceed 5° C. To bring the reaction to completion, the reaction mixture is further treated at room temperature for 10 hours.

The amine hydrochloride which has precipitated out is then separated off by means of a suction filter, the filtrate is extracted by shaking with water 3 times and separated off and the organic phase is dried with sodium sulfate.

The solvent toluene and any triethylamine still present are removed quantitatively in a rotary evaporator in vacuum at a bath temperature of a maximum of 50° C.

For a better storage stability, 0.008 part by weight of hydroquinone was added. The product VIII has a viscosity at 25° C. of 400 mPas.

EXAMPLE 4

43.05 parts by weight of the phosphorus-containing acrylate component VI described in Example 1 are mixed with 29.49 parts by weight of bisphenol A epoxyacrylate (Ebercryl 600®), 5.9 parts by weight of reactive diluent trimethylolpropane triacrylate, 0.39 part by weight of 2-methyl-1-[4(methylthio)-phenyl]-2-morpholinopropan-1-one (Irgacure 907®), 0.39 part by weight of isopropylthioxanthone (Quantacure ITX®), 0.78 part by weight of a peroxide (Luperox 231-50®) and 20.00 parts by weight of aluminum hydroxide (Apyral 4®) to give a homogeneous composition.

A composition which is storage-stable at room temperature and has a viscosity at 60° C. of 1240 mPas is obtained. It shows a good processibility.

Shaped articles can be produced from this composition in layers up to 1 cm thick by brief UV irradiation for 30 seconds. Any desired higher layer thicknesses can also be cured completely with the aid of after-treatment with heat at 130° C. for 30 minutes. The cured molded material complies with Standard UL 94 V0 of Underwriters Laboratories up to a specimen thickness of 1.6 mm.

EXAMPLE 5

41.67 parts by weight of acrylate component VI are mixed with 36.76 parts by weight of an acrylate-containing epoxyphenol novolak (Ebecryl 639®)—100 parts by weight of Ebecryl 639® comprise 30 parts by weight of trimethylolpropane triacrylate and 10 parts by weight of hydroxyethyl methacrylate—0.39 parts by weight of 2-methyl-1-[4 (methylthio)phenyl]-2-morpholinopropan-1-one (Irgacure 907®), 0.39 part by weight of isopropylthioxanthone (Quantacure ITX®), 0.78 part by weight of a peroxide (Luperox 231-50®) and 20.00 parts by weight of aluminum hydroxide (Apyral 4®) at 60° C. to give a homogeneous composition. The casting resin formulation has a viscosity at 60° C. of 1400 mPas and has a storage stability of 1 year at room temperature.

After mixing and degassing, this casting resin is introduced into a correspondingly flat casting mold, irradiated with UV for 60 seconds (intensity of the UV lamp 50 mW/cm²) and then subjected to after-treatment with heat at 120° C. for 1 hour.

Standardized test bars produced in this way are subjected to the flameproof test in accordance with Underwriters Laboratories UL 94 V0. The casting resin molded material according to the invention complies with the flame resistance specification up to a specimen thickness of 3.2 mm and shows good mechanical and chemical properties of the molded material.

The phosphorus-containing acrylates VII and VIII can be mixed with the other resin components in an analogous manner to give ready-to-use reactive resins, which in turn have a high storage stability, a viscosity which is sufficiently low for casting resin uses and easy curability to give flame-resistant molded materials.

Although modifications and changes may be suggested by those skilled in the art, it is the intention of the inventors to embody within the patent warranted hereon all changes and modifications as reasonably and properly come within the scope of their contribution to the art.

We claim:

1. A composition comprising
   a reaction product of an epoxide-containing phosphorous compound with a hydroxyalkyl (meth)acrylate;
   another unsaturated compound which can undergo free radical copolymerization with acrylates; and
   a free radical photoinitiator system.

2. The resin of claim 1 wherein the epoxide-containing phosphorous compound has the following formula:

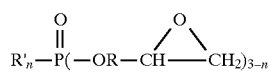

wherein n is an integer ranging from 1 to 2, R' is selected from the group consisting of alkyl and aryl and R is an alkylene radical.

3. The resin of claim 1 wherein the hydroxyalkyl (meth)acrylate has the following formula:

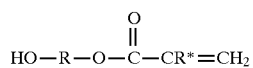

wherein R is an alkylene radical and R* is selected from the group consisting of hydrogen and methyl.

4. The resin of claim 1 wherein the resin is solvent-free.

5. The resin of claim 1 wherein the resin is further characterized as having a phosphorous content ranging from 0.5% to 5% by weight.

6. The resin of claim 1 wherein the free radical initiator can be activated by heat.

7. The resin of claim 1 further comprising a mineral filler in an amount ranging from 0% to 60% by weight.

8. The resin of claim 1 further comprising an organic peroxide having a decomposition point of greater than 80° C.

9. The resin of claim 1 wherein said another unsaturated compound which can undergo free radical copolymerization with acrylates is selected from the group consisting of (meth)acrylates, polyepoxides esterified with (meth)acrylic acid and low molecular weight polyacrylate reactive diluents other than the polyepoxides esterified with (meth)acrylic acid.

* * * * *